Dec. 12, 1967  F. WHITTLE ETAL  3,357,707
SHAFT SEALING SYSTEMS

Filed July 7, 1965  9 Sheets-Sheet 7

INVENTORS
FRANK WHITTLE
JOHN FRANK SAUNDERS
BY
Bailey, Stephens & Huettig
ATTORNEYS

Dec. 12, 1967   F. WHITTLE ETAL   3,357,707
SHAFT SEALING SYSTEMS

Filed July 7, 1965   9 Sheets-Sheet 9

INVENTORS
FRANK WHITTLE
JOHN FRANK SAUNDERS

Bailey, Stephens & Huettig
ATTORNEYS

United States Patent Office 3,357,707
Patented Dec. 12, 1967

3,357,707
SHAFT SEALING SYSTEMS
Frank Whittle, Walland Hill, Chagford, and John Frank Saunders, Bristol, England; said Saunders assignor to Bristol Siddeley Engines Limited, Bristol, England, a British company
Filed July 7, 1965, Ser. No. 470,040
Claims priority, application Great Britain, July 10, 1964, 28,663/64
12 Claims. (Cl. 277—28)

ABSTRACT OF THE DISCLOSURE

In a seal assembly comprising inner and outer sleeve members and two sealing devices acting between the sleeve members, there is pumping means driven by relative rotation of the sleeves, and preventing the pressure between the sealing devices from substantially exceeding the pressure at the low pressure end of the assembly, and there is control means arranged to control flow past the sealing device at the high pressure end so as to prevent the pressure between being less than the pressure at the low pressure end.

---

The invention relates to shaft sealing systems of the kind in which a high pressure zone on one side of the system is separated from a low pressure zone on the other side by two sealing devices with an inter-seal space between them, and a pump is provided to return fluid leaking from the high pressure zone into the inter-seal space back to the high pressure zone, the pressure in the inter-seal space not being allowed to fall below that of the low pressure zone.

One object of the invention is to provide a system of this kind adapted for use where no space is available for mounting pumps and other equipment externally of the annular space occupied by the sealing devices, and the operating conditions are very arduous and exacting, as for example in well-drilling equipment including a turbine operated at the bottom of the bore hole by drilling fluid pumped down to it at high pressure. In this case a very effective seal is required to prevent the escape of lubricant from the lubrication system of the turbine and its replacement by drilling fluid laden with rock debris, and the problem is made more acute by the severe vibration to which the equipment is subjected, and the relatively small radial dimension of the annular space available for the sealing system between the hollow rotary shaft conveying the drilling fluid and the casing of the turbine.

According to the invention a seal assembly for insertion is an annular space between relatively rotatable shaft and casing parts, to prevent escape of fluid from a high pressure end of the said space to a low pressure end, comprises inner and outer sleeve members for fitting on the shaft and in the casing respectively, two sealing devices each acting between the inner and outer sleeve members and separated by an inter-seal space, positive displacement pumping means arranged between the innermost inner sleeve surface and the outermost outer sleeve surface and having an inlet opening from the inter-seal space and an outlet opening to the high pressure side of the sealing device at the high pressure end, and including an inlet valve and an outlet valve, pump driving means arranged so as to drive the pumping means during relative rotation of the sleeves, the pumping means preventing the pressure in the inter-seal space substantially exceeding the pressure at the low pressure end of the assembly while there is relative rotation between the inner and outer sleeves, and control means in the assembly responsive to pressure difference across the sealing device at the low pressure end and arranged to control a flow past the seal-ing device at the high pressure end so as to prevent the pressure in the inter-seal space being less than the pressure at the low pressure end of the assembly, at least while there is relative rotation between the inner and outer sleeves.

The flow past the sealing device at the high pressure end controlled by the control means may be either the discharge of the pumping means or a flow into the inter-seal space.

When the discharge of the pumping means is controlled, the control may operate on the pump driving means, on the pump inlet or outlet valves or on a valve by-passing one or other of these valves.

When flow into the inter-seal space is controlled, the control preferably operates on a valve by-passing the seal at the high pressure end.

The pumping means preferably comprises at least one cylinder formed in an annular member of the assembly, and a plunger operating in the cylinder and having an end cooperating directly or indirectly with a cam track formed on another annular member of the assembly which, in operation, rotates relatively to the first-mentioned annular member.

Figure 12:
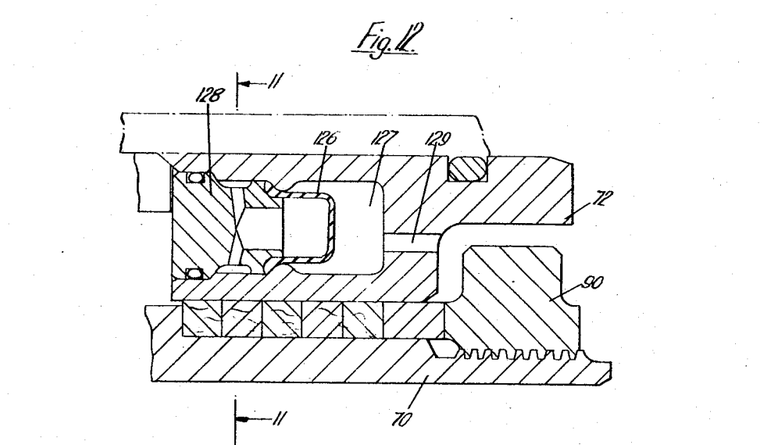
FIGURE 12 is a partial radial section at the line 12—12 in FIGURE 11.
Figure 13:
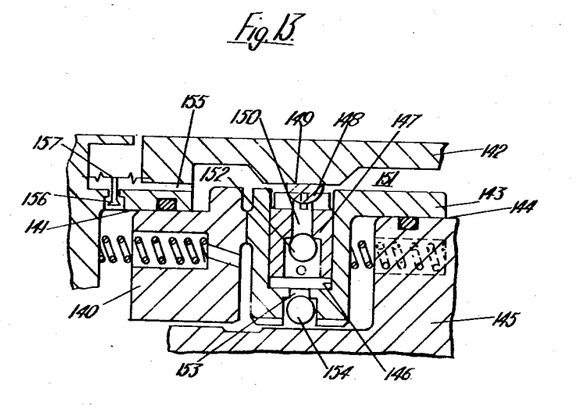
FIGURE 13 is a partial axial section illustrating a third arrangement.
Figure 14:
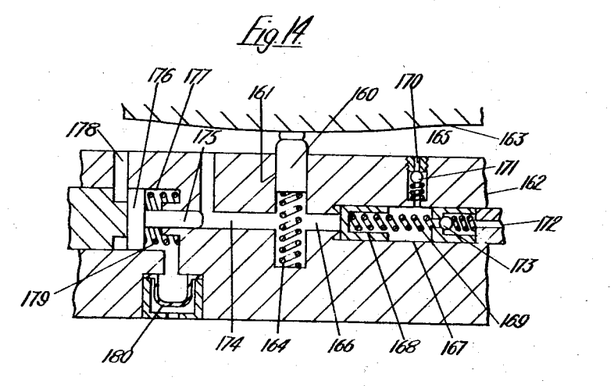
FIGURE 14 is a partial "tangential" section illustrating a fourth arrangement.

These and other features of the invention are illustrated in the accompanying drawings showing as examples four arrangements in well-drilling turbines. FIGURES 1 to 7 relate to the first example, FIGURES 8 to 12 to the second example, while FIGURES 13 and 14 illustrate other arrangements semi-diagrammatically.

In the drawings:
FIGURE 2 is a partial transverse section at the line 2—2 in FIGURE 1A,
FIGURES 3 and 4 are fragmentary sections at the lines 3—3 and 4—4 respectively in FIGURE 2.

In the example shown in FIGURES 1 to 7 the turbine parts adjacent to the seal assembly comprise a tubular shaft 20, the axis of which is shown at 21, journalled in a casing 22 by means of a double taper roller bearing 23a, 23b. The shaft has a splined part 24 on which an output coupling member 25 for attachment to a drill bit is mounted. To the left of the bearing 23b, as seen in FIGURE 1B, the clearance space between the shaft and the casing is closed by a pair of lip seals 19 arranged back to back, and the shaft is formed with an annular cavity divided by a flexible sleeve 18 into an inner lubricant reservoir 17 and an outer pressurising chamber 16.

The lubricant reservoir is connected to the bearing space 10 by a passage 15, while the pressurising chamber is connected by passages 13 and 14 to the space 11 to the left of the seals 19, in which the pressure is substantially equal to that at the inlet to the turbine. A further connection through a restrictor 12 to the bore of the shaft 20 may be provided to prevent accumulation of sediment in these spaces 11, 13, 14. The axis 21 is vertical during normal use, the left hand end of FIGURE 1B being uppermost, and drilling fluid which has been pumped down to the turbine leaves through the bore of the shaft. The fluid at high pressure is ejected through jets in the drill bit to assist the cutting action, and returns up the bore hole, around the casing 22, laden with rock debris. The reservoir 17 and the bearing space 10 are fitted with lubricating oil at turbine inlet pressure so that, although there is substantially no pressure difference across the seals 19, there is a large pressure difference between the bearing cavity and the outside of the casing, and an effective sealing system is necessary below the bearings to prevent escape of oil and contamination of the oil by sand from the drilling fluid or by rock debris. The solution of the problem is made more difficult by the severe vibration which is produced by the operation of the drill bit in hard rock formations.

In this example the sealing system below the bearings comprises inner sleeve members 26 and 27 which engage one another by means of dog teeth 28 and are mounted on the coupling member 25, rotation relatively thereto being prevented by a number of dowels 29 engaging recesses 30 in the member 27. An outer sleeve member 31 is fitted in the bore of the casing 22 and is held between a screw threaded locking ring 32 and a spacing sleeve 33 engaging the outer race of the bearing 23a.

Figure 1A:
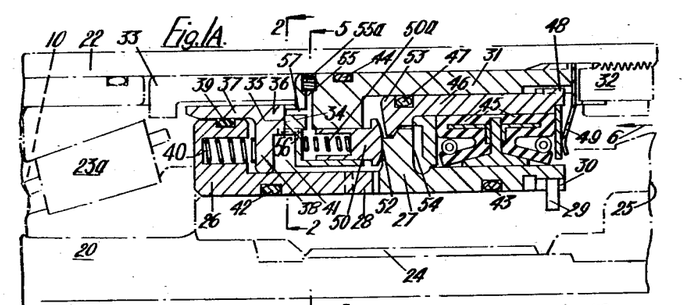
FIGURE 1A is a section taken radially through the first example on one side of the axis of rotation.
Figure 1B:
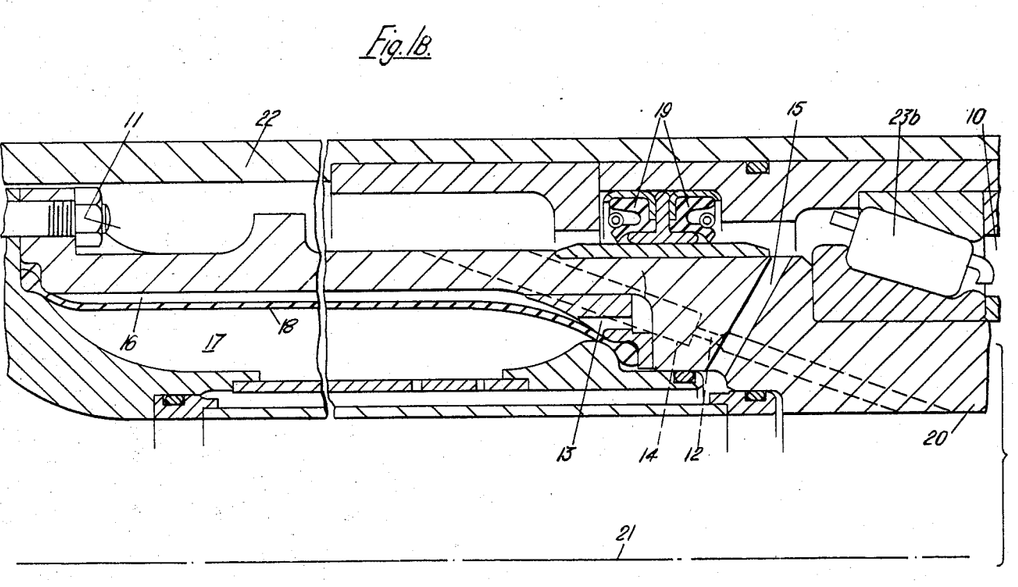
FIGURE 1B is a continuation of FIGURE 1A towards the left, showing other parts of the lubrication system.

The outer sleeve 31 is formed at its left-hand end, as seen in FIGURE 1A, with a flat face-seal surface 34 which is engaged by a counter face-seal surface 35 on a seal ring 36 having an axial flange 37 and a radial flange 38. The inner surface of the axial flange 37 slides on an outwardly flanged part of the inner sleeve 26, a secondary O ring seal 39 being interposed, and the sealing surfaces 34 and 35 are held in inter-engagement by springs 40, housed in pockets in the sleeve 26 and bearing on the radial flange 38. The surface engaged by the secondary seal 39 is preferably at a radius such that the seal ring 36 is substantially balanced between the pressures in the bearing cavity and the inter-seal space 41. Dowel pins, not shown, disposed at angular spacings between the springs 40 ensure that the seal ring 36 rotates with the inner sleeve 26. Leakage from the bearing cavity between the inner sleeve and the coupling member 25 to the inter-seal space is prevented by an O ring 42, while further O rings 43 and 44 prevent leakage between the inner sleeve 27 and the coupling member 25 and between the outer sleeve 31 and the casing 22 respectively.

The inter-seal space 41 is separated from space outside the casing by a low pressure seal consisting of a pair of lip seals 45 arranged back-to-back in a sleeve 46 mounted to slide in the outer sleeve 31 with the interposition of an O ring 47, the seals engaging an external surface part of the inner sleeve 27. Rotation of the sleeve 46 relative to the outer sleeve 31 is prevented by a dog connection 48, and, for a reason presently explained, the low pressure seal assembly is urged against the pressure in the inter-seal space 41 by a circular multiple-leaf spring 49 (see FIGURE 6) the outer periphery of which is clamped between the sleeve 31 and the locking ring 32.

Oil leaking from the bearing cavity into the inter-seal space 41 is returned by a pump system comprising six plungers 50 operating in cylinders 51 (see FIGURE 5) formed at equal angular spacings in an inwardly projecting flange part of the outer sleeve 31, the plungers being urged axially by springs 50a towards engagement with a cam surface 52 formed on an outwardly projecting flange part of the inner sleeve 27. However, except when there is leakage from the bearing cavity into the inter-seal space 41, the plungers 50 are held out of engagement with the cam surface 52 by a head portion 53 of the sleeve 46, this sleeve 46 being moved to the left by the pressure of the leaf spring 49. If oil leaks from the bearing cavity into the inter-seal space 41, the pressure in this space increases above that in the bore hole outside the casing until the low pressure seal assembly is driven to the right against the leaf spring 49 sufficiently far to give the pump plungers 50 a working stroke which just returns the leakage to the bearing cavity. Should the leakage increase to an extent beyond the capacity of the pumping system, a sealing face on the head 53 engages a counter surface 54 of the sleeve 27. These surfaces will of course be rotating relatively to one another, but as this is only an emergency sealing device, the possibility of wear at this point can be tolerated.

Figures 2, 3, 4:
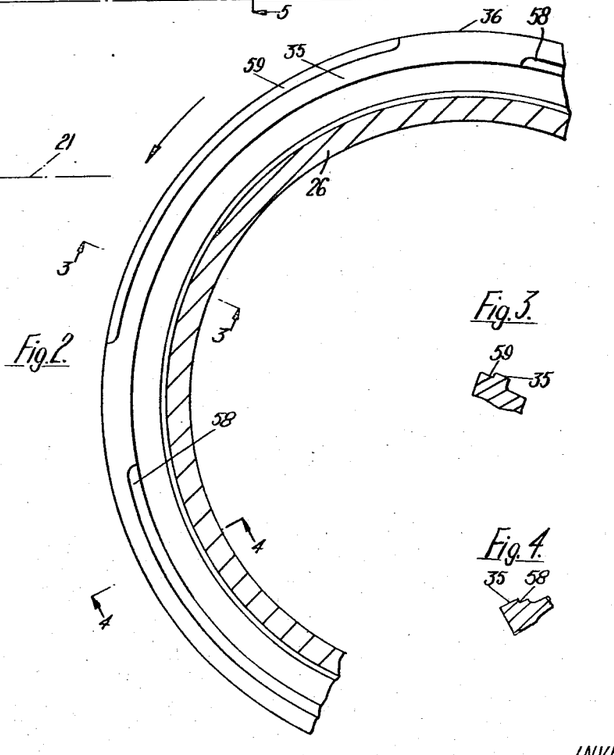
Figure 5:
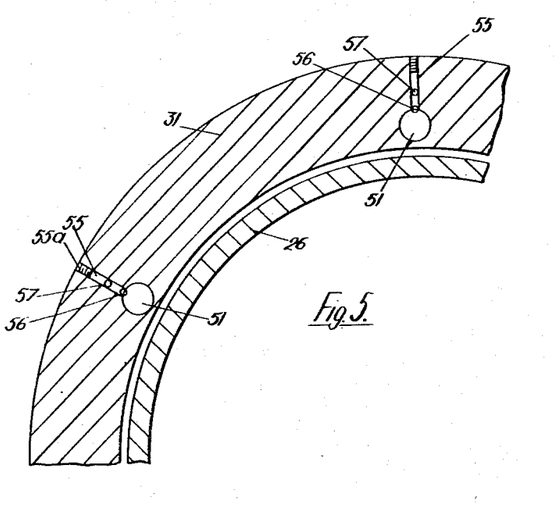
FIGURE 5 is a partial transverse section at the line 5—5 in FIGURE 1A.
Figure 6:
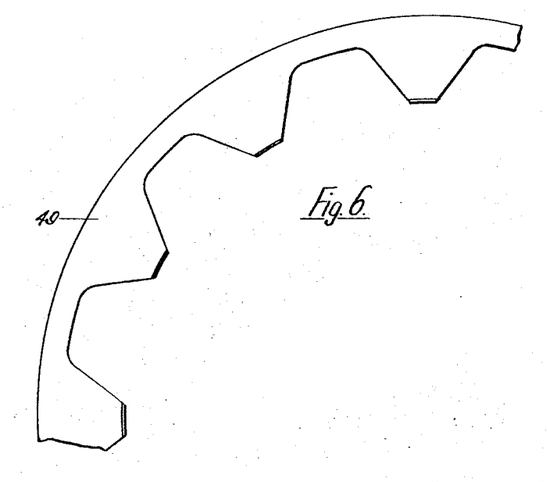
FIGURE 6 shows part of one of the components as seen in the direction of the arrow 6 in FIGURE 1A.

The inlet and discharge passage system of the pumps can be seen in FIGURES 1A, 2 and 5 and comprises a bore 55 extending radially outwards from each pump cylinder and having inner and outer branch bores extending axially to the face seal surface 34, the inner bore 56 operating as an inlet passage and the outer bore 57 as an outlet passage, the outer end of the radial bore being plugged at 55a. The counter face seal surface 35 on the rotating seal ring 36 is provided with alternate recesses 58 and 59 in its inner and outer edges (see FIGURES 2 to 4), and these recesses co-operate with the bores 56 and 57 to form a mechanically operated inlet and discharge valve system.

Figure 7:
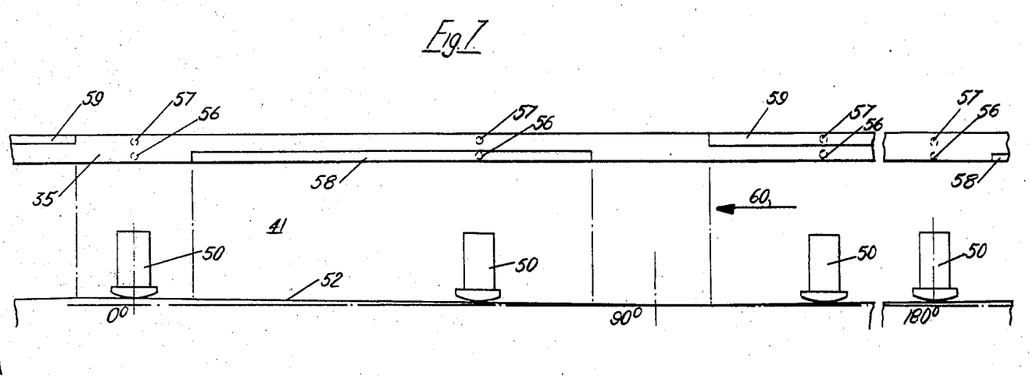
FIGURE 7 is a diagram showing the timing of pump inlet and discharge valves.

Part of the face seal surface 35 is shown in developed form in FIGURE 7 to illustrate diagrammatically the formation of the recesses in relation to the contour of the cam surface 52, which rotates with the surface 35 in the direction of the arrow 60, the pistons 50 and the ports 56 and 57 remaining in fixed angular positions. The cam surface has two crests, at the 0° and 180° positions respectively, and two valleys at the intervening 90° and 270° positions. There is a short dwell at each of these positions, during which both the ports 56 and 57 of the cylinder are closed by parts of the face seal surface 35 free from recesses. Considering the plunger 50 at the 0° position in FIGURE 7, as the cam 52 and the face seal surface 35 move to the left, the plunger makes an outward stroke under the pressure of its spring, the inlet port 56 being open to the inter-seal space 41 during this period so that oil enters the cylinder. There is then a dwell with both ports closed, followed by an inward stroke and opening of the discharge port 57 to allow the oil in the cylinder to be discharged back into the bearing cavity. The plungers operate oppositely in pairs, thus avoiding pressure fluctuations in the inter-seal space 41 which might tend to cause mud from the bore hole to be drawn in past the low pressure seal assembly. The pressure in the inter-seal space 41 is in fact always slightly higher than the bore hole pressure on the other side of the low pressure seal assembly by virtue of the force of the spring 49.

In the second example, shown in FIGURES 8 to 12, an inner sleeve 70 fitted on the hollow turbine shaft 20 is locked in place between the inner race of the bearing 23 and the output coupling member 25. Outer sleeves 71 and 72 fitted in the casing 22 are connected together by bolts 73, a sealing gasket being interposed, and are locked in place between the outer race of the bearing 23 and a screw-threaded locking ring 74. A groove 75, constituting an oil return passage as will presently be explained, is formed along part of the external surfaces of the outer sleeves, these external parts being sealed from the bearing cavity by an O ring 76 and from the bore hole space outside the casing by an O ring 77.

Figure 8:
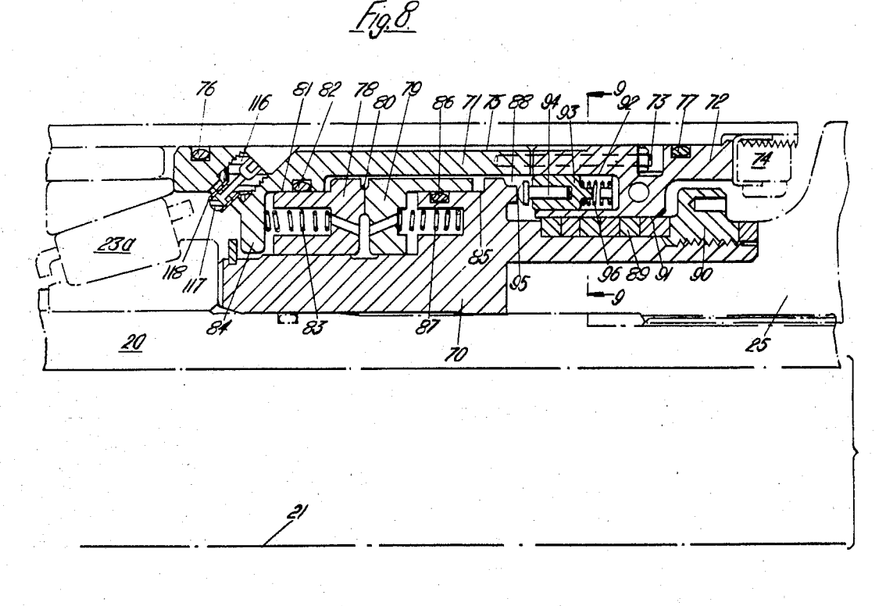
FIGURE 8 is a section taken radially through the second example on one side of the axis of rotation.

The high pressure end seal is constituted by two face seal rings 78 and 79 having abutting flat sealing faces at 80. The left-hand ring 78, as seen in FIGURE 8, is axially slidable on a cylindrical surface 81 formed on the outer sleeve 71, an O ring seal 82 being interposed, but is fixed against rotation relatively thereto by dowels, not shown, which are located at angular intervals between springs 83 housed in pockets in the ring and reacting against a flange 84 projecting inwards from the sleeve 71 to urge the ring to the right. The right-hand ring 79 is axially slidable on a cylindrical surface 85 formed on the inner sleeve 70, an O ring seal 86 being interposed, but is connected for rotation therewith by dowels, not shown, which are located at angular intervals between springs 87 housed in pockets in the sleeve 70 and reacting against the ring 79 to urge the ring to the left. The cylindrical surfaces 81 and 85 are equal in diameter so that the hydraulic pressures acting on the rings 78 and 79 do not tend to move them axially. In operation, the left-hand end of the assembly is uppermost, and the rings 78 and 79 float between the pressures of the springs 83 and 87 and are thereby to a large extent isolated from shocks travelling up the assembly from the drill bit, which is connected directly or indirectly to the output coupling member 25. Sealing assemblies of this kind are described in United States patent application Ser. No. 381,832.

Any lubricating oil escaping from the bearing cavity outwardly between the rings 78 and 79 enters an inter-seal space 88 separated from space outside the casing by a low pressure seal consisting of a number of rings of packing material 89 compressed in a recess in the inner sleeve 70 by a screw threaded gland nut 90 and bearing against a cylindrical surface 91 on the outer sleeve 72.

At each of two diametrically opposite positions, the outer sleeve 72 is provided with an axially extending pump cylinder bore 92 in which operates a plunger 93 having a tappet 94 engaging a cam surface 95 formed on the inner (rotating) sleeve 70. The cam contour is a simple "swash" surface providing one suction and one delivery stroke per revolution, the pump plungers moving oppositely so as to avoid pressure fluctuations in the inter-seal space 88. The plungers are maintained in contact with the cam 95 by springs 96.

Figure 9:
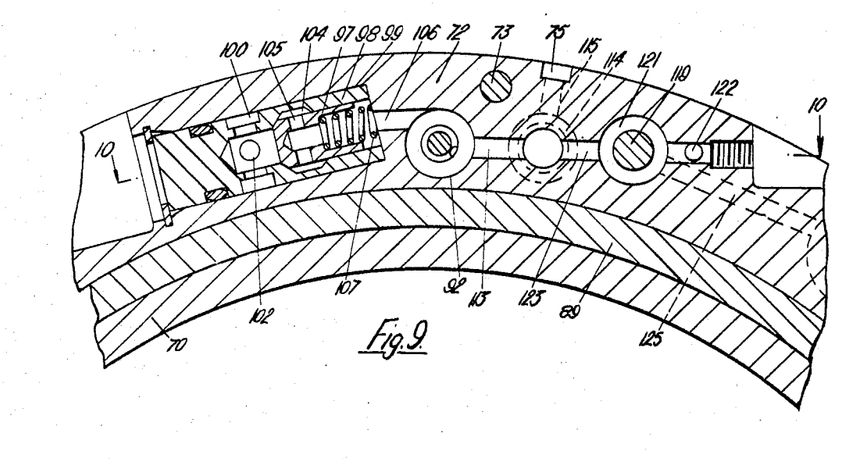
FIGURE 9 is an enlarged partial transverse section at the line 9—9 in FIGURE 8, but stepped axially as shown by the line 9—9 in FIGURE 10.
Figure 10:
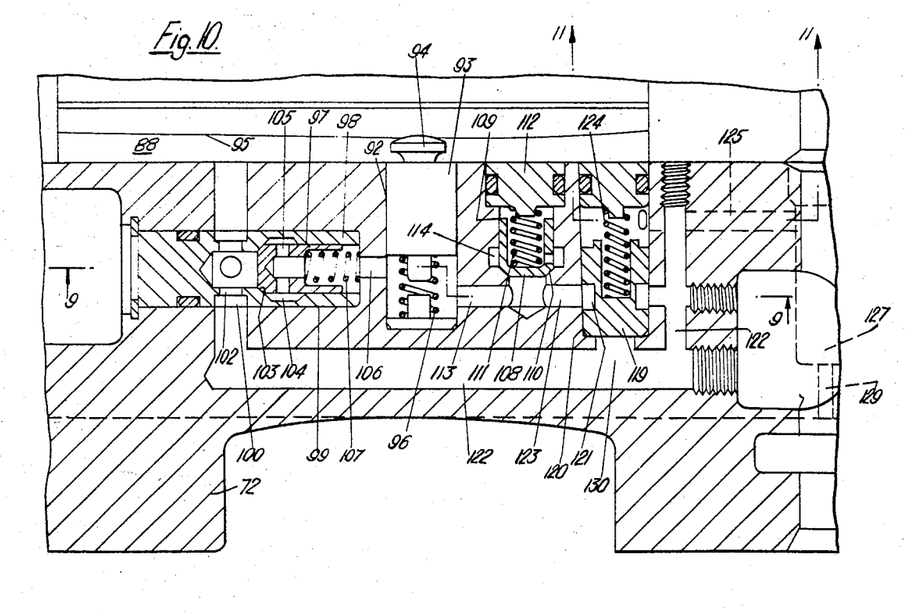
FIGURE 10 is a partial section taken at the stepped line 10—10 in FIGURE 9.

As shown in FIGURES 9 and 10, each pump has an inlet valve 97 operating in a sleeve 98 housed in a bore 99 extending circumferentially into the outer sleeve 72. The sleeve 98 has an external annular recess 100 communicating with an axial passage 101 opening into the inter-seal space 88. From the recess 100, holes 102 lead to the interior of the sleeve and, when the valve is open, flow occurs past a valve seating surface 103 to an internal recess 104 which is in communication with the interior of the valve by way of holes 105 and with the cylinder 92 by way of a passage 106. A light spring 107 keeps the inlet valve closed except during pump suction.

The delivery valve system is also shown mainly in FIGURES 9 and 10 and comprises a delivery valve 108 operating in an axially extending bore 109 in the outer sleeve 72 and urged against a seating 110 by a light spring 111 reacting against a plug 112. The bore 109 communicates with the pump cylinder 92 by a passage 113, and on the other side of the seating 110 has an external annular recess 114 which, as shown in FIGURE 9, is connected to the oil return groove 75 by a radial passage 115. From the groove 75 the oil returns to the bearing cavity by way of a supplementary non-return valve comprising a screw 116 (FIGURE 8) with a central bore leading into a stem part 117 carrying a rubber sleeve 118 covering branch outlet holes from the central bore.

Figure 11:
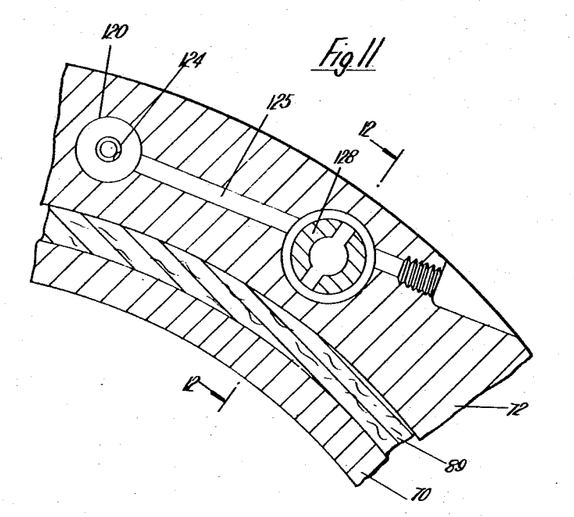
FIGURE 11 is a partial transverse section at the line 11—11 in FIGURES 10 and 12.

To prevent the pumps reducing the pressure in the inter-seal space 88 to below the pressure in the bore hole outside the casing, which would encourage entry of grit past the low pressure seal, a system for by-passing the inlet valves 97 is provided. For each pump cylinder this comprises a shuttle valve 119 operating in an axial bore 120 in the outer sleeve 72 and having an external groove 121 which, in one end position of the valve 119, connects a passage 122 from the inlet valve recess 100 to the interior of the pump cylinder 92 by way of a passage 123, an end portion of the valve cylinder bore 109 and the passage 113. The shuttle valve 119 is urged to the said end position by a spring 124 and by hydraulic pressure transmitted through a passage 125 from the interior of a rubber capsule 126 which, as shown in FIGURES 11 and 12, is clamped in a recess 127 in the sleeve 72 by a plug 128, the exterior of the capsule being subjected to bore hole pressure by way of a passage 129. The other end of the shuttle valve 119 is subjected to the pressure in the inter-seal space 88 by way of a branch 130 from the passage 122. When the inter-seal space pressure exceeds the bore hole pressure plus the force of the spring 124, the shuttle valve 119 is displaced axially so that connection between the parts 122 and 123 of the passage by-passing the pump inlet valve 97 is interrupted and the pump becomes operative to return oil from the inter-seal space to the bearing cavity by the route already described.

If the turbine is stalled, the pressure in the inter-seal space will rise, and sufficient leakage may occur past the piston of the shuttle valve 119 into the capsule 126 to over-extend and damage it. To prevent this, a relief valve with a low opening pressure may be connected between the passage 125 and the space outside the low pressure seal 89 to prevent the pressure in the capsule rising substantially above that in the bore hole.

The seal assembly shown in FIGURES 8 to 12 has the advantage that it can be tested before installation, and then installed without separation of the co-acting sealing members, so as to avoid the possibility of a defect being introduced during re-assembly of component parts.

In both the arrangements already described, the pump cylinders are formed in a sleeve member which is in fixed relation to the casing, but they could equally well be formed in a member which is in fixed relation to the shaft, both arrangements enabling the pressure difference across the low pressure sealing means to be applied in a convenient manner to lift the pump pistons off their driving cams or to control the operation of the pump inlet and/or discharge valves. FIGURE 13 illustrates a further arrangement in which the pump cylinders are formed in one of the axially slidable face seal rings.

In FIGURE 13, the upstream face seal ring 140 slides axially on a surface 141 on a sleeve member 142 fixed to the casing, which is considered to be the non-rotating member, while the rotating face seal ring 143 slides axially on a surface 144 on a sleeve member 145 fixed to the shaft. Two or more equally spaced radial cylinder bores 146 are formed in the ring 143, and each bore contains a pump piston 147 having a slipper 148 at its radially outer end engaging a cam surface 149 on the sleeve 142. The piston has an axial bore 150 constituting an inlet passage from the inter-seal space 151. This inlet passage 150 is closed during the pumping stroke by a ball 152. At its radially inner end the cylinder has a discharge passage 153 communicating with the bearing cavity. This passage 153 is closed during the suction stroke by a ball 154.

To prevent the pumps reducing the pressure in the inter-seal space 151 to below the pressure outside the casing, a passage 155 is provided from the bearing cavity to the inter-seal space, and this passage 155 is controlled by a valve 156 operated by a diaphragm 157 subjected on one side to the pressure in the inter-seal space and on the other side to the pressure outside the casing. In effect, the valve 156 allows sufficient oil to pass the seal between the rings 140 and 143 to prevent the pumps reducing the pressure in the inter-seal space 151 to below that outside the casing.

FIGURE 14 illustrates another convenient arrangement in which the control acts on a transmission system between a cam follower and a pump piston. FIGURE 14 is analogous to FIGURE 10 and is a diagrammatic "tangential" section through part of a sleeve member, fixed either to the casing or to the shaft. A cam follower piston 160 operates in a bore 161 in the sleeve member 162 and is held in engagement with a cam 163 on an adjacent relatively rotatable member by a light spring 164. The space 165 is part of the inter-seal space. From behind the piston 160 a branch 166 from the cylinder leads to the end of a pump cylinder 167 containing a pump piston 168 operating against a light spring 169, the cylinder having an inlet passage 170 from the inter-seal space 165 controlled by an automatic inlet valve 171, and a discharge passage 172 to the bearing cavity controlled by an automatic discharge valve 173. Also branching from the cylinder 161 is a passage 174 leading to the inter-seal space 165 and controlled by a shut-off valve 175 operated by a piston 176 moving in a cylinder 177. A passage 178 from the inter-seal space to the cylinder 177 allows the inter-seal space pressure to act on the piston 176 in the shut-off direction in opposition to a spring 179 plus the pressure outside the casing, transmitted through a rubber capsule 180 as described in connection with FIGURE 12.

With this arrangement, reciprocation of the cam follower piston 160 merely displaces oil in and out of the inter-seal space until the inter-seal space pressure rises sufficiently above the pressure outside the casing to cause the piston 176 to close the valve 175. The oil trapped in the cylinder 161 and the passage 166 then acts as a transmission element to operate the pump piston 168. The particular advantage of this arrangement is that it allows great latitude in the positioning of the various components and thus simplifies their accommodation in a sleeve member of small cross sectional dimensions.

We claim:
1. A seal assembly for insertion in an annular space between relatively rotatable shaft and casing parts, to prevent escape of fluid from a high pressure end of the said space to a low pressure end, comprising inner and outer sleeve members for fitting on the shaft and in the casing respectively, two sealing devices each acting between the inner and outer sleeve members and separated by an inter-seal space, positive displacement pumping means arranged between the innermost inner sleeve surface and the outermost outer sleeve surface and having an inlet opening from the inter-seal space and an outlet opening to the high pressure side of the sealing device at the high pressure end and including an inlet valve and an outlet valve, pump driving means arranged so as to drive the pumping means during relative rotation of the sleeves, the pumping means preventing the pressure in the inter-seal space substantially exceeding the pressure at the low pressure end of the assembly while there is relative rotation between the inner and outer sleeves, and control means in the assembly responsive to pressure difference across the sealing device at the low pressure end and arranged to control a flow past the sealing device at the high pressure end so as to prevent the pressure in the inter-seal space being less than the pressure at the low pressure end of the assembly, at least while there is relative rotation between the inner and outer sleeves.

2. A seal assembly according to claim 1, in which the flow past the sealing device at the high pressure and controlled by the control means is the discharge from the pumping means.

3. A seal assembly according to claim 2, in which the control means operates on the pump driving means.

4. A seal assembly according to claim 3, in which the pump driving means includes a cam follower piston and a liquid transmission between the cam follower piston and a pump piston, and a release valve arranged to release liquid from the transmission, and the control means operates on the release valve.

5. A seal assembly according to claim 2, in which the control means operates on the pump inlet valve.

6. A seal assembly according to claim 2, in which the control means operates on the pump outlet valve.

7. A seal assembly according to claim 2, including an inlet bypass valve bypassing the pump inlet valve, and in which the control means operates on the inlet bypass valve.

8. A seal assembly according to claim 2, including an outlet bypass valve bypassing the pump outlet valve, and in which the control means operates on the outlet bypass valve.

9. A seal assembly according to claim 1, in which the flow past the sealing device at the high pressure end controlled by the control means is a flow into the inter-seal space.

10. A seal assembly according to claim 8, including a further valve bypassing the seal at the high pressure end, in which the control means operates on the further valve.

11. A seal assembly according to claim 1, in which the pumping means comprises at least one cylinder formed in an annular member of the assembly, a cam track formed on another annular member of the assembly which, in operation, rotates relatively to the first mentioned annular member, and a plunger operating in the cylinder and having an end cooperating directly or indirectly with the cam track.

12. A seal assembly according to claim 11, in which there are a plurality of cylinders and plungers with their axes substantially parallel to the axis of the assembly.

References Cited

UNITED STATES PATENTS 2,999,702   9/1961   Dunn et al. _________ 277—28
3,062,554   11/1962   McGahan et al. _______ 277—3

FOREIGN PATENTS 1,329,274   4/1963   France.

SAMUEL ROTHBERG, *Primary Examiner.*